US012476390B2

(12) United States Patent
Randolph

(10) Patent No.: US 12,476,390 B2
(45) Date of Patent: Nov. 18, 2025

(54) ELECTRICAL CONNECTION TO LITZ WIRE

(71) Applicant: TE Connectivity Solutions GmbH, Schaffhausen (CH)

(72) Inventor: Kurt Allan Randolph, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 565 days.

(21) Appl. No.: 17/878,540

(22) Filed: Aug. 1, 2022

(65) Prior Publication Data

US 2024/0039174 A1 Feb. 1, 2024

(51) Int. Cl.
*H01R 4/18* (2006.01)
*H01R 11/12* (2006.01)
*H01R 43/048* (2006.01)

(52) U.S. Cl.
CPC ............. *H01R 4/184* (2013.01); *H01R 11/12* (2013.01); *H01R 43/048* (2013.01)

(58) Field of Classification Search
CPC ...... H01R 4/184; H01R 11/12; H01R 43/048; H01R 43/0484; H01R 43/05; H01R 4/18
See application file for complete search history.

(56) References Cited

U.S. PATENT DOCUMENTS 4,993,959 A * 2/1991 Randolph ................ H01R 4/64 439/865
8,196,299 B2 6/2012 Lee et al.
8,902,033 B2 12/2014 Shepard et al.
9,502,785 B2 * 11/2016 Schmidt ............... H01R 43/048
9,583,280 B2 2/2017 Zaho et al.
9,806,441 B2 * 10/2017 Yoshioka ................ H01R 11/11
10,957,992 B2 3/2021 Randolph et al.
2012/0248093 A1 * 10/2012 Ulrich ...................... H05B 6/14 219/600

(Continued)

FOREIGN PATENT DOCUMENTS

CN 103370844 A * 10/2013 ............. H02G 1/128
CN 104025706 B 10/2015

(Continued)

OTHER PUBLICATIONS

Machine Translation JP 2012069334 A, (dated Apr. 5, 2020) (Year: 2025).*

(Continued)

*Primary Examiner* — Travis S Chambers

(57) ABSTRACT

An electrical connector assembly includes a Litz wire having multiple wire strands. Each wire strand has a conductor and an insulator. The electrical connector assembly includes an electrical contact having a contact portion at a mating end and a Litz wire termination portion at a terminating end. The contact portion is configured to make an electrical connection with a mating contact. The Litz wire termination portion is crimped to an end of the Litz wire. The Litz wire termination portion is heated by an induction heating device after being crimped to the end of the Litz wire to heat the wire strands and melt away the insulators of the wire strands to electrically connect the conductors at the end of the Litz wire to make an electrical connection with the individual wire strands of the Litz wire.

12 Claims, 4 Drawing Sheets

(56) References Cited

U.S. PATENT DOCUMENTS

| | | | | |
|---|---|---|---|---|
| 2015/0074990 A1* | 3/2015 | Bluemmel | ........... | H01R 43/058 29/753 |
| 2019/0221949 A1* | 7/2019 | Bluemmel | ........... | H01R 43/058 |

FOREIGN PATENT DOCUMENTS

| | | | | | |
|---|---|---|---|---|---|
| CN | 108352624 | A | * | 7/2018 | ............. H01R 4/184 |
| CN | 107039783 | B | * | 4/2019 | ........... H01R 13/504 |
| EP | 0771135 | B1 | | 1/2005 | |
| JP | 2011124178 | A | * | 6/2011 | |
| JP | 2012069334 | A | * | 4/2012 | |
| KR | 20120027682 | A | * | 3/2012 | |
| KR | 20130131085 | | | 12/2013 | |
| WO | WO-2020007285 | A1 | * | 1/2020 | ............. B23K 20/00 |

OTHER PUBLICATIONS

Machine Translation WO 2020007285 A1, (dated Jan. 9, 2020) (Year: 2025).*

* cited by examiner

ELECTRICAL CONNECTION TO LITZ WIRE

BACKGROUND OF THE INVENTION

The subject matter herein relates generally to termination methods for Litz wire.

Litz wire is a unique multistrand wire or cable used in electronics to carry alternating current. For example, some known cooking appliances use induction heating to cook food through heat generated by a working coil formed by a Litz wire. The Litz wire uses an alternating magnetic field to generate heat. The Litz wire is designed to reduce the skin effect and proximity effect losses in conductors used at frequencies up to about 1 MHz, thereby producing a more efficient magnetic field. Litz wire consists of many thin wire strands which are individually insulated. A terminal is connected at an end of the Litz wire for connection to a power source of the appliance.

Existing methods of connecting a terminal to deliver power to all strands of Litz wire requires dipping the Litz wire into a solder bath to melt off the insulation from each strand or mechanically strip each strand, prior to termination, in order to assure a connection to each strand. This process consumes time, is potentially hazardous due to outgassing of the insulation material, and is costly. Additionally, existing mechanical crimp connections fail to make contact with each strand in a Litz wire and also tend to break strands due to their inherently aggressive design.

Accordingly, there is a need for an electrical contact and method which effectively terminates to each strand of a Litz wire without the need to treat or strip the individual wires prior to termination.

BRIEF DESCRIPTION OF THE INVENTION

In one embodiment, an electrical connector assembly is provided and includes a Litz wire having multiple wire strands. Each wire strand has a conductor and an insulator. The electrical connector assembly includes an electrical contact having a contact portion at a mating end and a Litz wire termination portion at a terminating end. The contact portion is configured to make an electrical connection with a mating contact. The Litz wire termination portion is crimped to an end of the Litz wire. The Litz wire termination portion is heated by an induction heating device after being crimped to the end of the Litz wire to heat the wire strands and melt away the insulators of the wire strands to electrically connect the conductors at the end of the Litz wire to make an electrical connection with the individual wire strands of the Litz wire.

In another embodiment, an applicator device for connecting an electrical contact to a Litz wire is provided. The applicator device includes a terminator having a forming die and an anvil at a crimp zone. The forming die is operably coupled to a press. The press moves the forming die along a crimping stroke during a crimping operation. The Litz wire is loaded into a Litz wire termination portion of the electrical contact and positioned on the anvil in the crimp zone. The forming die is pressed toward the anvil during the crimping operation to crimp the Litz wire termination portion to the Litz wire to form an electrical contact assembly. The applicator device includes an induction heating device proximate to the terminator. The induction heating device has an induction heating coil including an induction heating zone. The electrical contact assembly is positioned in the induction heating zone. The electrical contact assembly heats the Litz wire termination portion and the Litz wire to heat wire strands of the Litz wire and melt away insulators of the wire strands to electrically connect conductors of the wire strands to make an electrical connection between the Litz wire termination portion and the individual wire strands of the Litz wire.

In a further embodiment, a method of connecting an electrical contact to a Litz wire is provided. The method loads an end of the Litz wire into a Litz wire termination portion of the electrical contact. The method crimps the Litz wire termination portion to the end of the Litz wire to compress insulators and conductors of wire strands of the Litz wire in the Litz wire termination portion to form an electrical contact assembly. The method heats the Litz wire termination portion with an induction heating coil to heat the wire strands of the Litz wire and melt away the insulators of the wire strands to electrically connect the conductors of the wire strands to make an electrical connection between the Litz wire termination portion and the individual wire strands of the Litz wire.

DETAILED DESCRIPTION OF THE INVENTION

Figure 1:
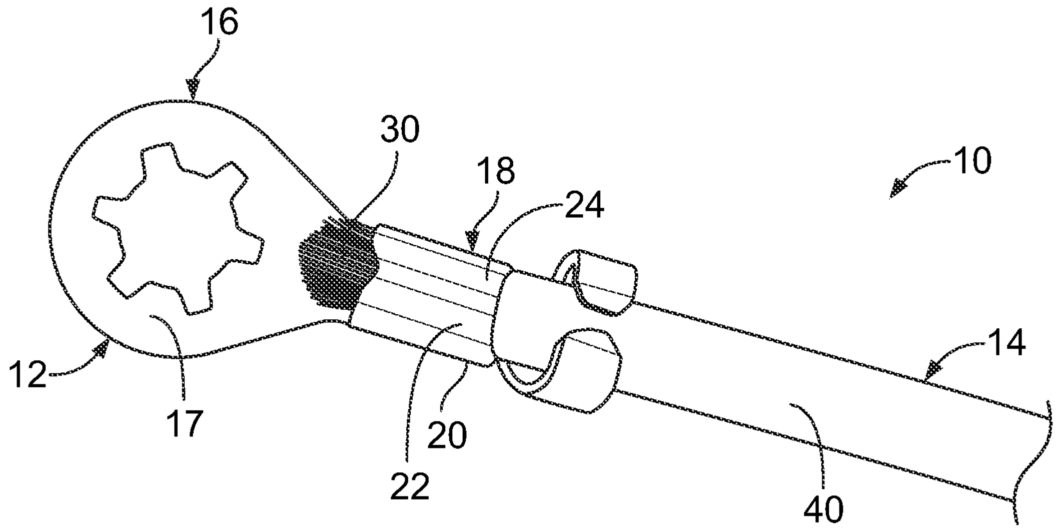
FIG. 1 is a perspective view of a portion of an electrical contact assembly in accordance with an exemplary embodiment showing an electrical contact terminated to an end of a Litz wire.
Figure 2:
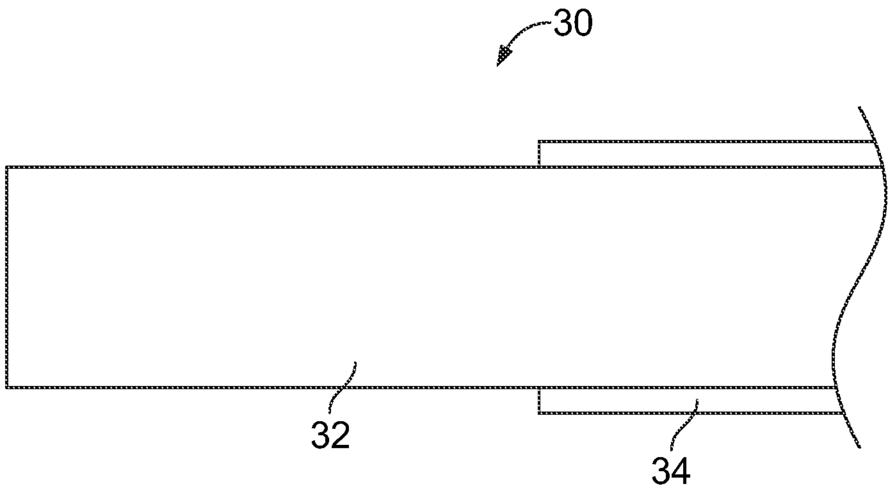
FIG. 2 is a perspective view of a portion of the electrical contact assembly in accordance with an exemplary embodiment showing a wire strand of the Litz wire.

FIG. 1 is a perspective view of a portion of an electrical contact assembly 10 in accordance with an exemplary embodiment showing an electrical contact 12 terminated to an end of a Litz wire 14. FIG. 2 is a perspective view of a portion of the electrical contact assembly 10 in accordance with an exemplary embodiment showing a wire strand 30 of the Litz wire 14. The Litz wire 14 is a multistrand wire or cable having a plurality of the wire strands 30 used to carry alternating current.

The Litz wire 14 reduces the skin effect and proximity effect losses in conductors used at frequencies up to about 1 MHz, thereby producing a more efficient magnetic field. The Litz wire 14 consists of many of the thin wire strands 30 which are individually insulated. The wire strands 30 may be arranged in a braided pattern to equalize the proportion of the overall length over which each strand is at the outside of the Litz wire 14. This has the effect of distributing the current equally among the wire strands, reducing the resistance. In an exemplary embodiment, the Litz wire 14 includes an outer jacket 40 surrounding the wire strands 30. Optionally, a portion of the outer jacket 40 is removed from the end of the Litz wire 14 to expose the wire strands 30, such as to load the wire strands 30 into the electrical contact 12.

With reference to FIG. 2, each wire strand 30 is a magnet wire. The wire strand 30 includes a conductor 32 and an insulator 34 surrounding the conductor 32. As such, each wire strand 30 is individually insulated by the corresponding insulator 34. The magnet wire may be an enameled wire. For example, the conductor 32 is a copper or aluminum wire coated with a very thin layer of enamel or other insulation. The insulator 34 may be a polymer film. In an exemplary embodiment, a portion of the insulator 34 is removed at the end of the wire strand to expose the conductor 32. As such, the ends of the wire strands 30 may be electrically connected to each other and to the electrical contact 12. In an exemplary embodiment, the end of the insulator 34 is removed by an induction heating process targeted at the end of the wire strand 30. For example, the electrical contact 12 is heated by induction heating to remove the end portion of the insulator 34, as will be described in further detail below.

The electrical contact 12 has a contact portion 16 at a mating end for mating with a mating connector (not shown) and a Litz wire termination portion 18 at a terminating end for termination to the Litz wire 14. In an exemplary embodiment, the Litz wire termination portion 18 is a crimp barrel configured for crimped connection with an end of the Litz wire 14. In an exemplary embodiment, the contact portion 16 includes a ring terminal 17 configured to receive a fastener or post. In other embodiments, the contact portion 16 may include a tab, such as a weld tab, or other type of contact portion.

In an exemplary embodiment, the electrical contact 12 is stamped and formed from a metal blank or plate. The contact portion 16 is integral with the Litz wire termination portion 18. In an exemplary embodiment, the electrical contact 12 is manufactured from a ferrous metal. For example, the electrical contact 12 may be manufactured from a steel material, an iron alloy material, or other ferrous metal materials. The electrical contact 12 is manufactured from a material configured to be rapidly heated by induction heating when heated by an induction heating device, such as an induction heating coil.

The Litz wire termination portion 18 includes an end wall 20 at a bottom, a first side wall 22 which extends from one side of the end wall 20, and a second side wall 24 which extends from the opposite side of the end wall 20. The first and second side walls 22, 24 define crimping arms configured to be crimped around the Litz wire 14. The end wall 20, the first side wall 22 and the second side wall 24 cooperate with the Litz wire 14 to provide an electrical connection between the Litz wire 14 and the Litz wire termination portion 18 and to maintain the Litz wire 14 in position on the contact 12.

Figure 3:
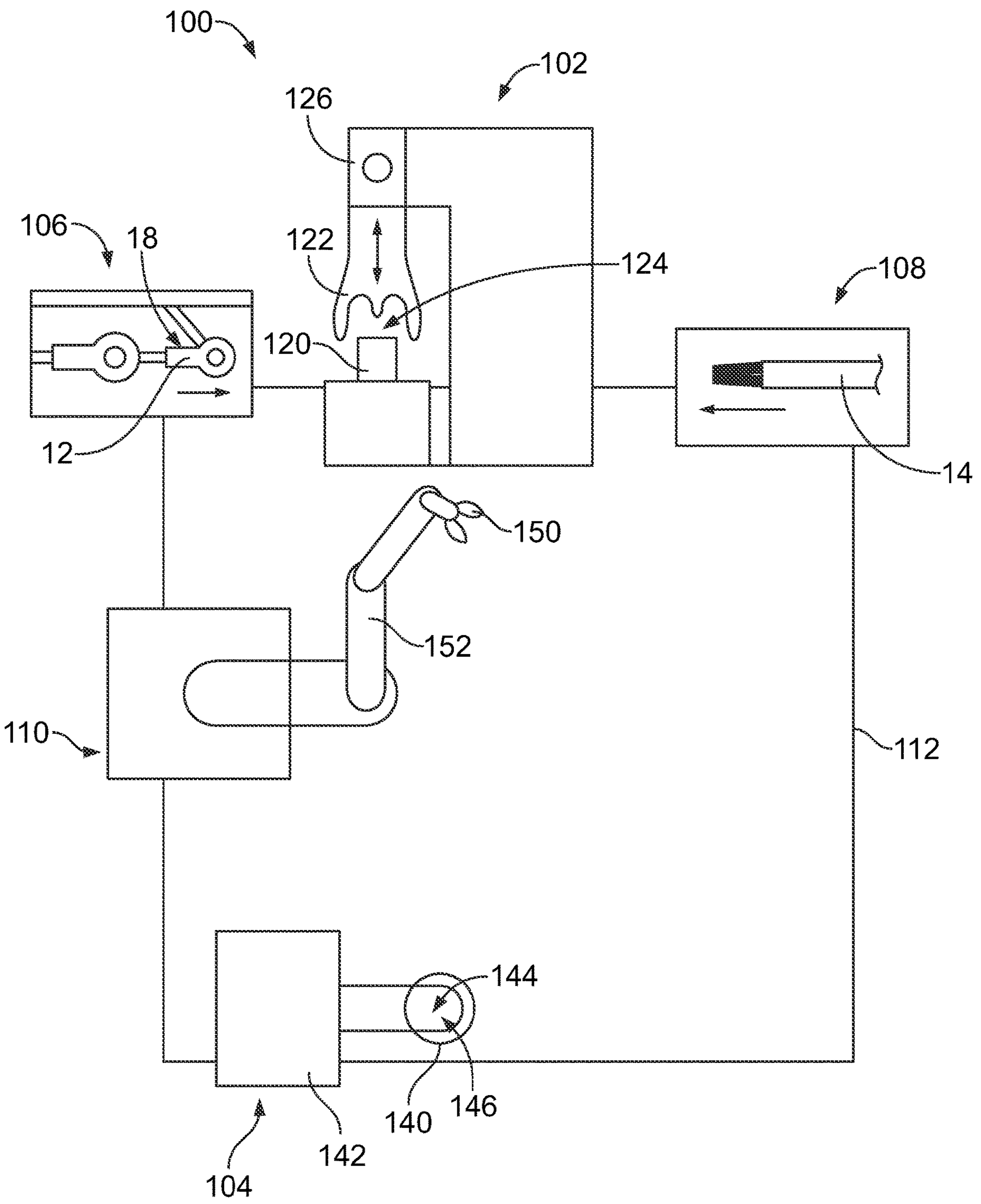
FIG. 3 illustrates an applicator device for assembling the electrical contact assembly in accordance with an exemplary embodiment.

FIG. 3 illustrates an applicator device 100 for assembling the electrical contact assembly 10 in accordance with an exemplary embodiment. The applicator device 100 is used for connecting the electrical contact 12 to the Litz wire 14. The applicator device 100 includes a terminator 102, an induction heating device 104, a terminal feeder 106, a wire feeder 108, and a transfer device 110. The terminator 102 and/or the induction heating device 104 and/or the terminal feeder 106 and/or the wire feeder 108 and/or the transfer device 110 may be mounted to a frame 112, such as to position the components relative to each other. The applicator device 100 may include additional components for assembling the electrical contact assembly 10.

In an exemplary embodiment, the terminator 102 is a crimping press. The terminator 102 is used for terminating the electrical contact 12 to the Litz wire 14. For example, the terminator 102 is used for crimping the electrical contact 12 to the Litz wire 14. The terminator 102 may be an automated machine, such as being operated by a motor. In other embodiments, the terminator 102 is hand operated. The terminator 102 includes an anvil 120 and a forming die 122 at a crimp zone 124. The forming die 122 is connected to a press 126. The press 126 moves the forming die 122 along a crimping stroke during a crimping operation. The press 126 presses the forming die 122 downward during the crimping operation to crimp the electrical contact 12 to the Litz wire 14. The anvil 120 forms a seat that supports the electrical contact 12 during the crimping process. The forming die 122 has a profiled surface that forms the electrical contact 12 during the crimping process. For example, the forming die 122 may form the crimping arms at the first and second side walls 22, 24 by pressing the crimping arms inward into the wire strands 30 to form an F-crimp. The wire strands 30 are tightly compressed in the Litz wire termination portion 18. The insulators 34 and the conductors 32 are compressed in the Litz wire termination portion 18.

In an exemplary embodiment, the induction heating device 104 is located proximate to the terminator 102. The induction heating device 104 includes an induction heating coil 140 and an electronic oscillator 142 that passes a high-frequency alternating current (AC) through the induction heating coil 140. The induction heating coil 140 may be an electromagnet. The rapidly alternating magnetic field is configured to penetrate the electrical contact assembly 10 and generating electric currents inside the electrical contact assembly 10 to heat the electrical contact 12 and the conductors 32 to melt the insulators 34. In an exemplary embodiment, the induction heating coil 140 is wrapped into a cylindrical structure defining a coil bore 144. The coil bore 144 defines an induction heating zone 146. The induction heating coil 140 creates a magnetic field in the coil bore 144. During operation, the electrical contact 12 and the Litz wire 14 are received in the coil bore 144. The electrical contact 12 and the Litz wire 14 are heated by the induction heating coil 140 to melt the insulators 34 from the ends of the wire strands 30 to expose and electrically connect the conductors 32 of the wire strands 30 to each other and to the electrical contact 12.

The terminal feeder 106 is located adjacent the terminator 102. The terminal feeder 106 feeds the electrical contacts 12 to the crimp zone 124, such as on a carrier strip. The terminal feeder 106 may be tied to the crimp stroke of the press 126. In alternative embodiments, the electrical contact 12 may be manually fed to the crimp zone 124, such as being hand fed to the crimp zone 124.

The wire feeder 108 is located adjacent the terminator 102. The wire feeder 108 feeds the Litz wire 14 to the crimp zone 124, such as into the Litz wire termination portion 18. In alternative embodiments, the Litz wire 14 may be manually fed to the crimp zone 124, such as being hand fed to the crimp zone 124. In various embodiments, the Litz wire 14 may be loaded into the Litz wire termination portion 18 prior to locating the electrical contact 12 and the Litz wire 14 in the crimp zone 124.

The transfer device 110 is located adjacent the terminator 102 and the induction heating device 104. The transfer device 110 is used to transfer the electrical contact assembly 10 from the terminator 102 to the induction heating device 104. The transfer device 110 transfers the electrical contact assembly 10 from the terminator 102 after the Litz wire termination portion 18 is crimped to the Litz wire 14. The transfer device 110 transfers the electrical contact assembly 10 to the induction heating coil 140. For example, the electrical contact 12 in the end of the Litz wire 14 are loaded into the coil bore 144 of the induction heating coil 140. In an exemplary embodiment, the transfer device 110 includes a gripper 150 configured to grip the Litz wire 14 and/or the electrical contact 12 and an arm 152 movable from the terminator 102 to the induction heating device 104. The arm 152 may rotate between a first position and a second position to move the gripper 150 between the terminator 102 and the induction heating device 104. In various embodiments, the arm 152 may be a robot arm movable in three-dimensional space. Alternatively, the arm 152 may be a rotating platform movable into dimensional space. The transfer device 110 may be used to move the electrical contact assembly 10 to another location after the induction heating process, such as to an assembly station or a packaging station. Other types of transfer devices may be used in alternative embodiments. In other various embodiments, the electrical contact assembly may be moved manually, such as by hand, between the terminator 102 and the induction heating device 104.

Figure 4:
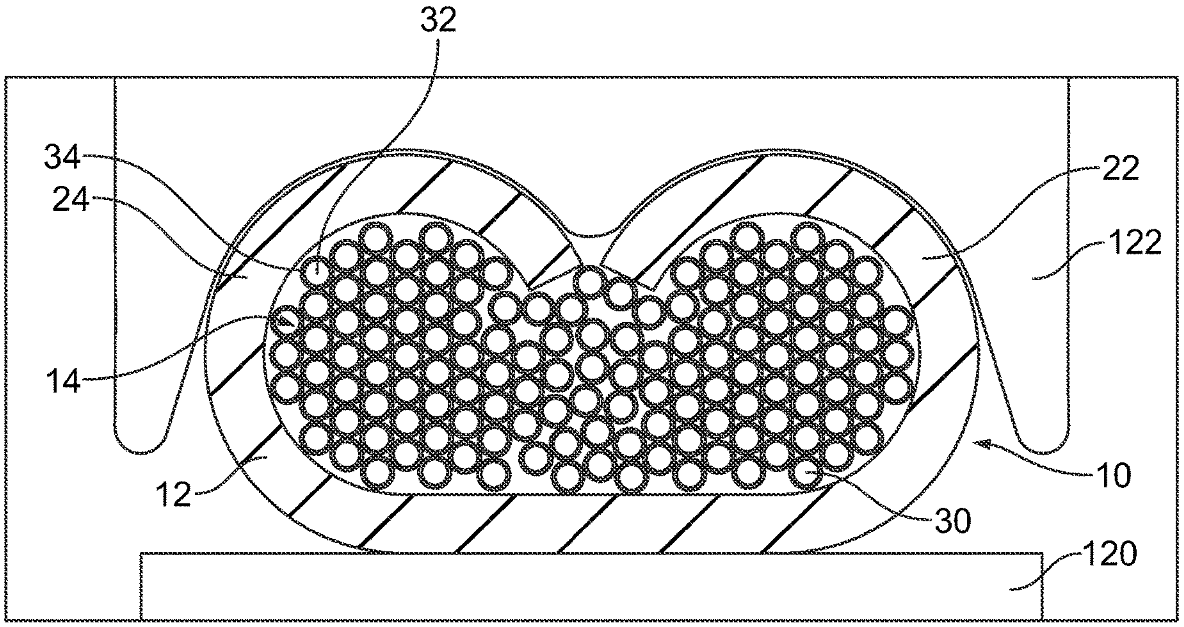
FIG. 4 is a cross-sectional view of the electrical contact assembly in the crimp zone in accordance with an exemplary embodiment.

FIG. 4 is a cross-sectional view of the electrical contact assembly 10 in the crimp zone 124. The electrical contact assembly 10 is shown between the anvil 120 and the forming die 122. The anvil 120 supports the bottom of the Litz wire termination portion 18. The wire strands 30 are positioned within the Litz wire termination portion 18 between the side walls 22, 24. The forming die 122 forms the side walls 22, 24 around the wire strands 30 and compresses the wire strands 30 during the crimping process. The insulators 34 and the conductors 32 are compressed together after the Litz wire termination portion 18 is crimped. In an exemplary embodiment, the insulators 34 are later removed by a heating process performed by the induction heating device 104.

Figure 5:
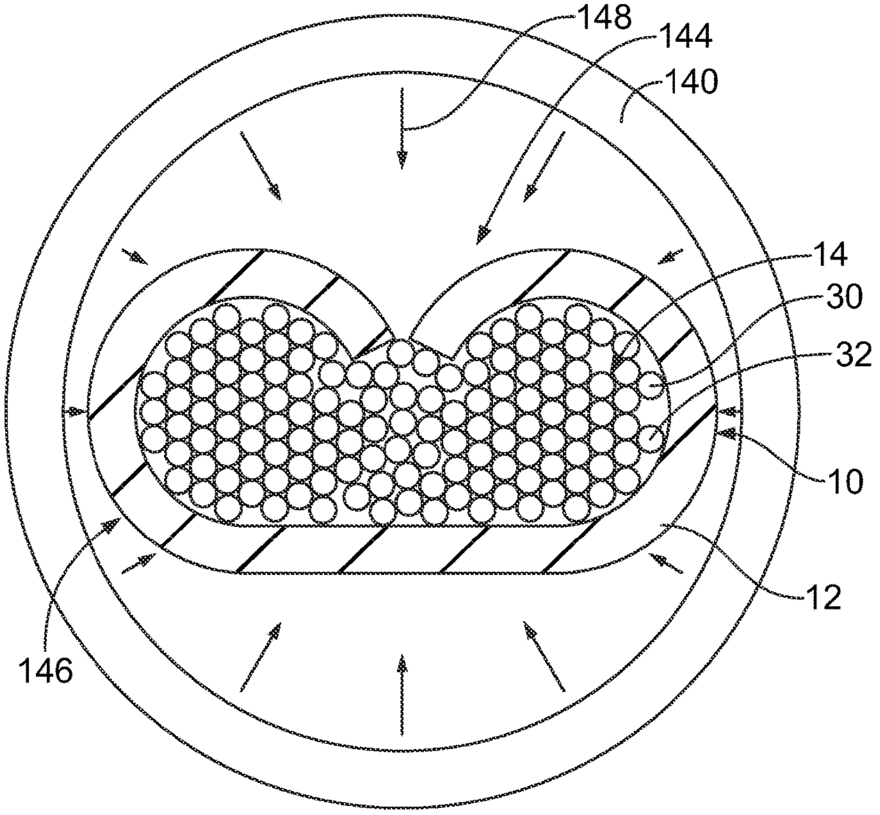
FIG. 5 is a cross-sectional view of the electrical contact assembly in the coil bore of the induction heating coil in accordance with an exemplary embodiment.

FIG. 5 is a cross-sectional view of the electrical contact assembly 10 in the coil bore 144 of the induction heating coil 140. The induction heating coil 140 is shown surrounding the electrical contact assembly 10. However, in alternative embodiments, the induction heating coil 140 may be planar rather than forming a bore, wherein the planar induction heating coil 140 is configured to be positioned adjacent the electrical contact 12 to heat the electrical contact 12.

The induction heating coil 140 creates a magnetic field 148 in the induction heating zone 146. The electronic oscillator 142 passes a high-frequency alternating current (AC) through the induction heating coil 140. The rapidly alternating magnetic field penetrates the electrical contact 12, generating electric currents inside the electrical contact 12, called eddy currents. The eddy currents flow through the resistance of the material of the electrical contact 12, and heat the electrical contact 12 by Joule heating. In an exemplary embodiment, the electrical contact 12 is manufactured from a ferrous metal material, such as steel, which has high resistance to quickly heat the electrical contact 12. Steel is a low cost material for producing the electrical contact 12. Heat may also be generated in the electrical contact 12 by magnetic hysteresis losses. The induction heating penetrates the entire wire bundle of wire strands through the Litz wire 14. The induction heating may additionally be induced in the conductors 32 to more efficiently melt away the insulators 34.

The frequency of the electric current used for induction heating depends on the size, material type, coupling spacing (between the induction heating coil 140 and the electrical contact 12), the number of strands, the thickness of the insulator 34, and the like. The induction heating process of the electrical contact 12 is sufficient to melt the insulators 34 at the ends of the wire strands 30. For example, the temperature may exceed the thermal breakdown temperature of the insulators 34 (which may be between approximately 120-220° C.). In various embodiments, the induction heating process may increase the temperature of the electrical contact 12 to a temperature in excess of 850° C. The induction heating process may be between approximately 1 second and 2 seconds to achieve sufficient heating in the electrical contact 12 to melt away the insulators 34 at the ends of the wire strands 30 to create an electrical connection between the Litz wire termination portion 18 and the conductors 32. Optionally, the electrical contact assembly 10 may be preheated prior to induction heating, such as using infrared heaters. The induction heating process removes the insulators 34 without the need for a solder pot to melt the insulators 34 or other noxious process to remove the insulators 34. The induction heating process is safe and fast. The induction heating process may be performed during an in-line manufacturing process, such as at a manufacturing station immediately after the crimping process at a crimping station. When the insulators 34 are removed (for example, melted away), the electrical contact 12 is electrically connected to the conductors 32 of the Litz wire 14 by a solderless connection. The crimping pressure of the side walls 22, 24 creates a mechanical and electrical connection between the Litz wire termination portion 18 and the conductors 32 of the wire strands 30.

Figure 6:
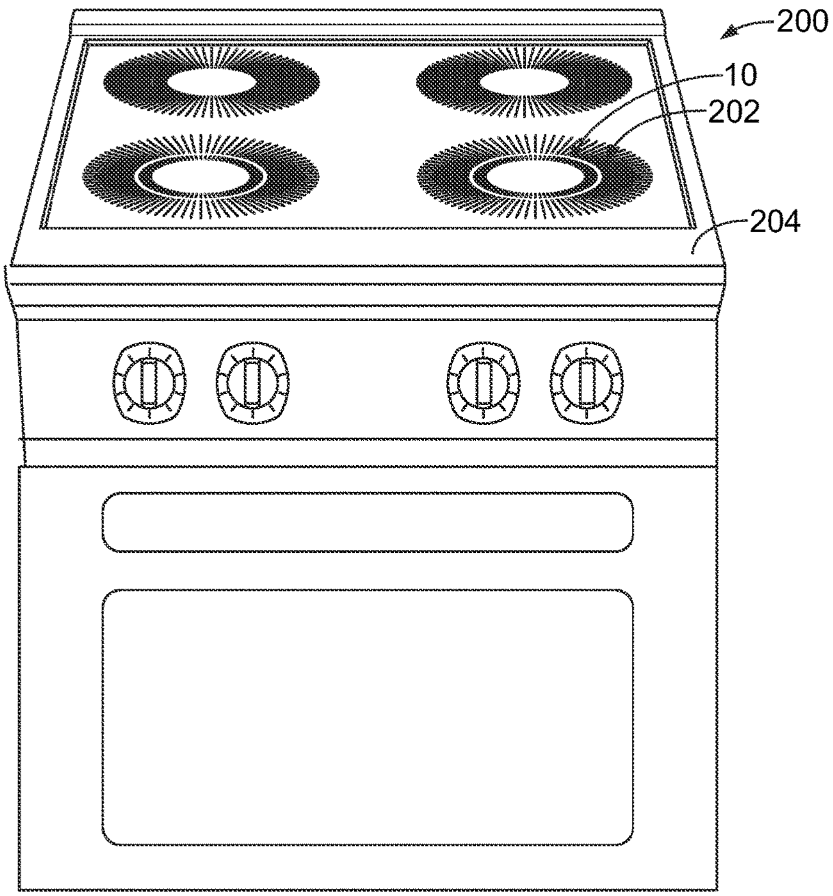
FIG. 6 illustrates an appliance that utilizes the electrical contact assembly in one or more heating elements at a cook surface of the appliance in accordance with an exemplary embodiment.
Figure 7:
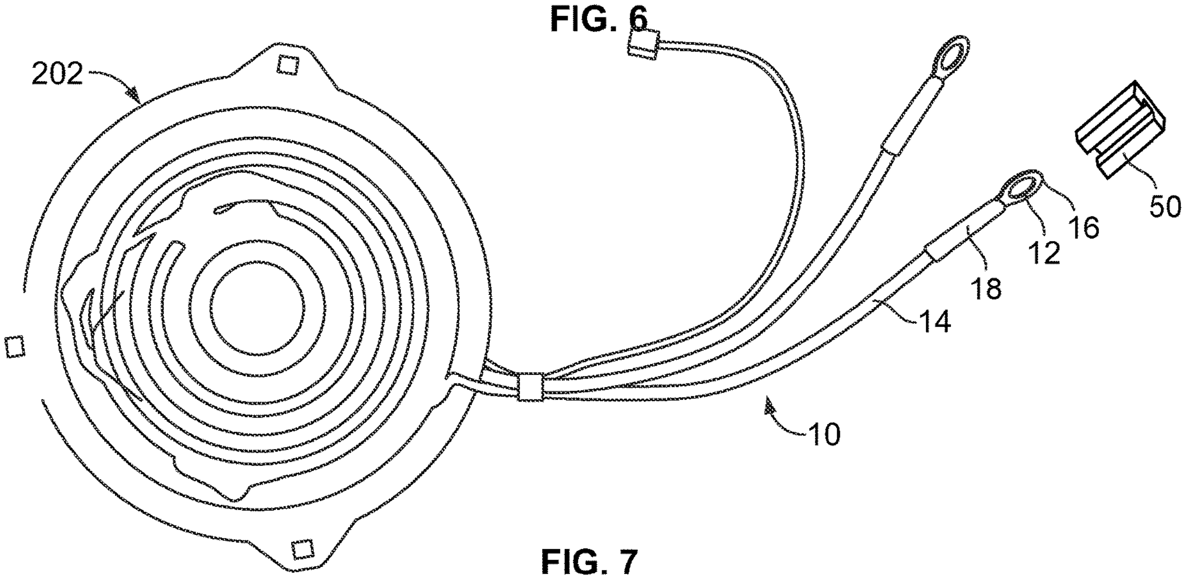
FIG. 7 illustrates a heating element for use in the appliance that utilizes the electrical contact assembly in accordance with an exemplary embodiment.

FIG. 6 illustrates an appliance 200 that utilizes the electrical contact assembly 10 in one or more heating elements 202 at a cook surface 204 of the appliance 200. FIG. 7 illustrates a heating element 202 for use in the appliance 200 that utilizes the electrical contact assembly 10. The Litz wire 14 is arranged in a helical or coil shape to form the heating element 202. The Litz wire 14 may be arranged in other arrangements to form heating elements having other shapes in alternative embodiments. The Litz wire 14 may be used in other applications other than the appliance 200 in alternative embodiments, such as an electrical relay or other high current electrical device. In an exemplary embodiment, a magnet 50 placed in the proximity of the electrical contact 12. The magnet 50 focuses the magnetic field effects and associated heating onto the Litz wire termination portion 18 of the electrical contact 12 during operation. The magnet 50 suppresses or diverts the magnetic field effects and associated heating away from the contact portion 16 of the electrical contact 12 to protect the contact portion 16 from adverse effects of extreme heat. The magnet 50 may have a slot or opening formed therein to position the magnet 50 relative to the electrical contact 12.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An applicator device for connecting an electrical contact to a Litz wire, the applicator device comprising:

a terminator having a forming die and an anvil at a crimp zone, the forming die being operably coupled to a press, the press moving the forming die along a crimping stroke during a crimping operation, wherein the Litz wire is loaded into a Litz wire termination portion of the electrical contact and positioned on the anvil in the crimp zone, the forming die being pressed toward the anvil during the crimping operation to crimp the Litz wire termination portion to the Litz wire to form an electrical contact assembly; and an induction heating device proximate to the terminator, the induction heating device having an induction heating coil including an induction heating zone, wherein the electrical contact assembly is positioned in the induction heating zone, the electrical contact assembly heating the Litz wire termination portion and the Litz wire to heat wire strands of the Litz wire and melt away insulators of the wire strands to electrically connect conductors of the wire strands to make an electrical connection between the Litz wire termination portion and the individual wire strands of the Litz wire.

2. The applicator device of claim 1, wherein the terminator is mounted to a frame, the induction heating device being mounted to the frame proximate to the terminator.

3. The applicator device of claim 1, wherein the induction heating coil is wrapped around a coil bore, the coil bore defining the induction heating zone receiving the electrical contact assembly.

4. The applicator device of claim 1, wherein the electrical contact is manufactured from a ferrous metal, the induction heating coil creating a magnetic field directed at the ferrous metal defining the Litz wire termination portion.

5. The applicator device of claim 1, wherein the terminator compresses the insulators in the crimp zone prior to melting away the insulators at the induction heating zone when heated by the induction heating coil.

6. The applicator device of claim 1, further comprising a terminal feeder feeding the electrical contact to the crimp zone.

7. The applicator device of claim 1, further comprising a transfer device transferring the electrical contact assembly from the crimp zone to the induction heating zone.

8. A method of connecting an electrical contact to a Litz wire, the method comprising:

loading an end of the Litz wire into a Litz wire termination portion of the electrical contact;

positioning the Litz wire termination portion and the end of the Litz wire into a crimp zone of a terminator having an anvil and a forming die operably coupled to a press configured to move the forming die along a crimping stroke during a crimping operation;

crimping the Litz wire termination portion to the end of the Litz wire by pressing the forming die toward the anvil during the crimping operation to compress insulators and conductors of wire strands of the Litz wire in the Litz wire termination portion to form an electrical contact assembly, wherein the insulators of the wire strands are located between the conductors of the wire strands in a bundle;

heating the Litz wire termination portion and the wire strands of the Litz wire received in the Litz wire termination portion with an induction heating device proximate to the terminator having an induction heating coil including an induction heating zone, wherein the electrical contact assembly is positioned in the induction heating zone, the induction heating coil operated to heat the wire strands of the Litz wire and melt away the insulators of the wire strands between the conductors of the wire strands and between the conductors and the Litz wire termination portion to electrically connect the conductors of the wire strands to each other and the Litz wire termination portion to make an electrical connection between the Litz wire termination portion and the individual wire strands of the Litz wire and the Litz wire termination portion.

9. The method of claim 8, wherein said heating the Litz wire termination portion comprises creating a magnetic field directed at the Litz wire termination portion.

10. The method of claim 8, wherein said crimping the Litz wire termination portion to the end of the Litz wire comprises positioning the Litz wire termination portion and the end of the Litz wire on an anvil of a terminator and pressing a crimping die against the Litz wire termination portion to deform the Litz wire termination portion and compress the wire strands of the Litz wire in the Litz wire termination portion.

11. The method of claim 8, further comprising moving the electrical contact assembly from a crimp zone to the induction heating coil.

12. The method of claim 8, further comprising positioning the electrical contact assembly in a coil bore of the induction heating coil to direct a magnetic field from the induction heating coil into the Litz wire termination portion.

* * * * *